(12) United States Patent
Imaeda

(10) Patent No.: US 7,284,407 B2
(45) Date of Patent: Oct. 23, 2007

(54) RECIPROCATING DRIVE MECHANISM AND PRESS USING THE SAME

(75) Inventor: Wataru Imaeda, Jushiyama-mura (JP)

(73) Assignee: Toyokoki Co., Ltd., Aichi (JP)

( * ) Notice: Subject to any disclaimer, the term of this patent is extended or adjusted under 35 U.S.C. 154(b) by 335 days.

(21) Appl. No.: 10/514,181

(22) PCT Filed: Dec. 1, 2003

(86) PCT No.: PCT/JP03/15363

§ 371 (c)(1),
(2), (4) Date: Nov. 12, 2004

(87) PCT Pub. No.: WO2004/052634

PCT Pub. Date: Jun. 24, 2004

(65) Prior Publication Data

US 2005/0204798 A1 Sep. 22, 2005

(30) Foreign Application Priority Data

Dec. 11, 2002 (JP) .............................. 2002-359887

(51) Int. Cl.
  B21D 9/05  (2006.01)
  B21J 7/46  (2006.01)
  B21J 9/18  (2006.01)
  B30B 1/18  (2006.01)
(52) U.S. Cl. .................. 72/443; 72/454; 72/389.3; 100/289
(58) Field of Classification Search .................. 72/441, 72/443, 454, 453.02, 31.11, 389.3; 74/89.23, 74/89.28, 424.8 B; 100/290, 257, 258 R, 100/258 A, 238, 280, 289
See application file for complete search history.

(56) References Cited

U.S. PATENT DOCUMENTS 5,488,880 A * 2/1996 Sartorio ...................... 72/454

FOREIGN PATENT DOCUMENTS

| JP | 53-132009 | 11/1978 |
| JP | 2-108539 | 8/1990 |
| JP | 6-54483 | 7/1994 |
| JP | 3344721 | 8/2002 |
| JP | 2003-200220 | 7/2003 |
| WO | WO 92/12362 | 7/1992 |

* cited by examiner

Primary Examiner—Derris H. Banks
Assistant Examiner—Teresa M. Bonk
(74) Attorney, Agent, or Firm—Rabin & Berdo, PC (57) ABSTRACT

A reciprocating drive mechanism for converting motor rotation into linear motions to produce a reciprocating drive force, and a press machine using the mechanism. The rotation of a first motor (20A) out of two motors (20A) and (20B) is converted into a high-speed low-torque rotational output and transmitted to a ball screw mechanism (50) by a first power transmission mechanism (30). The rotation of the second motor (20B) is converted into a low-speed high-torque rotational output and transmitted to the ball screw mechanism (50) by a second power transmission mechanism (40). The ball screw mechanism (50) is made of a feed screw (52) supported in a screw hole of a nut member (51) so as to be capable of screw-fed rotation. The feed screw (52) and the nut member (51) are coupled with the first power transmission mechanism (30) and the second power transmission mechanism (40), respectively. A corotation prevention mechanism (80) prevents the feed screw (52) from rotating together with the rotation of the nut member (51).

15 Claims, 7 Drawing Sheets

RECIPROCATING DRIVE MECHANISM AND PRESS USING THE SAME

TECHNICAL FIELD

This invention relates to a reciprocating drive mechanism for converting motor rotation into linear motions to produce a reciprocating drive force. In particular, this invention relates to a reciprocating drive mechanism for use in a press machine such as a press brake and an injection molding machine, and to a press machine using the reciprocating drive mechanism.

BACKGROUND ART

Figure 7:
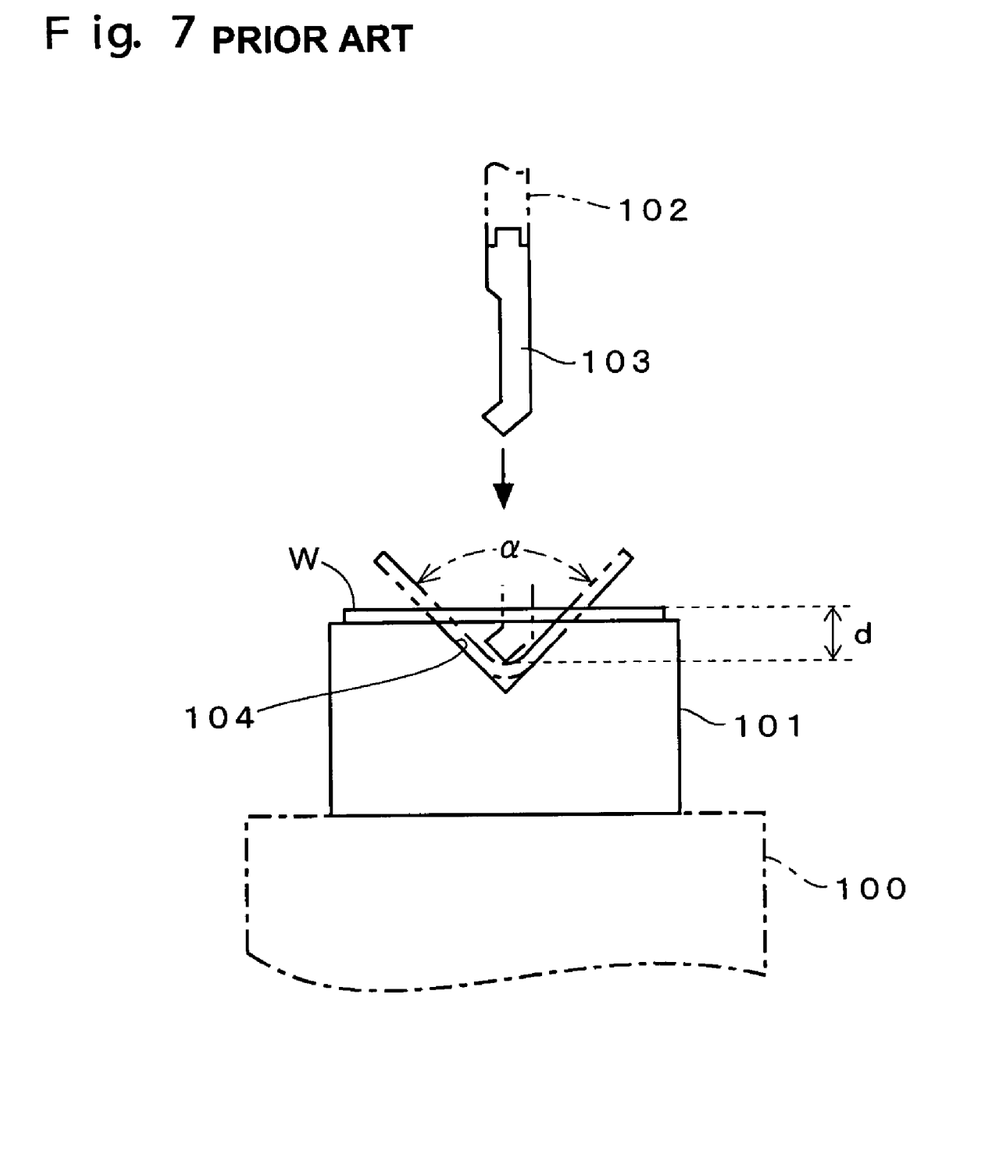
FIG. 7 is a side view showing the configuration of a conventional typical press brake.

In conventional typical press brakes, as shown in FIG. 7, a lower die 101 and an upper die 103 are attached to the top surface of a table 100 and the bottom of a not-shown ram via a holder 102, respectively, so that they are opposed to each other. A plate-like work W is supported on the lower die 101. The upper die 103 is lowered toward this work W together with the ram. The upper die 103 comes into contact with the work W on the way down, and the work W undergoes a pressing force from the upper die 103. The work W is pushed into a V-shaped groove 104 of the lower die 101 by this pressing force, being bent into a bending angle a corresponding to the amount of pushing d.

Among press brakes of this type are a press brake of hydraulic drive system in which a hydraulic cylinder is used as the driving source of the ram, and a press brake of motor drive system in which a servo motor is used. The press brake of motor drive system is equipped with a reciprocating drive mechanism which is configured so that the servo motor is connected with a ball screw mechanism through a power transmission mechanism. In this reciprocating drive mechanism, the number of rotations and the direction of rotation of the servo motor are controlled to move up and down the ram via the ball screw mechanism.

In recent years, improved performance has been strongly demanded of press brakes. To accelerate the bending operation and to enhance the precision of the bending process, it has been practiced to move the ram at low speed during the bending process while moving down or up the ram at high speed at approach time before the bending process and at return time after the bending process.

When the up-and-down movements of the ram are controlled as described above, it is possible to satisfy productivity requirements by the high speed operation of the ram at approach time and at return time. In the bending process, on the other hand, the ram is moved at low speed to bend the work gradually. As a result, it is possible to prevent the work from warpage and the like, and secure operator's safety.

By the way, the servo motor has a maximum number of rotations N and a maximum torque T available. The maximum speed of the ram and the maximum pressing force from the dies are determined by the capability of the servo motor and a reduction ratio of the power transmission mechanism.

Assume here that Nb is the number of rotations of the ball screw mechanism when moving up and down the ram at a desired maximum speed. Then, the reduction ratio (1/A) of the power transmission mechanism is given by $1/A=Nb/N$, and the maximum pressing torque Tp of the press brake is given by $Tp=A \cdot T=T \cdot N/Nb$.

As can be seen from above, given the number of rotations Nb of the ball screw mechanism in moving up and down the ram at a desired maximum speed, the pressing capability of the press brake is determined uniquely.

In the press brake of motor drive system described above, controls for switching the number of rotations of the servo motor between two levels, or high speed and low speed, are exercised so as to move the ram at low speed during a bending process while moving it at high speed at approach time and at return time. In this case, the possible output torque of the servo motor is constant or varies only slightly even when the number of rotations is changed.

Nevertheless, when the reduction ratio (1/A) is set lower in order to increase the moving speed of the ram at approach time and at return time, the maximum pressing torque Tp tends to be short. On the other hand, when the reduction ratio (1/A) is set higher in order to provide a sufficiently high maximum pressing torque Tp, it is impossible to increase the moving speed of the ram at approach time and at return time sufficiently.

To solve this problem, the applicant has recently developed a press brake which has a reciprocating drive mechanism including a first power transmission mechanism for reducing motor rotation at a first reduction ratio and transmitting it to the ball screw mechanism, and a second power transmission mechanism for reducing motor rotation at a second reduction ratio higher than the first reduction ratio and transmitting it to the ball screw mechanism.

In this press brake, at approach time, the first power transmission mechanism and the second power transmission mechanism are set to an active state and an inactive state, respectively, so that the die is moved toward the work at high speed. Then, the first power transmission mechanism and the second power transmission mechanism are set to an inactive state and an active state, respectively, so that the die is moved at low speed to bend the work. Moreover, at return time, the first power transmission mechanism and the second power transmission mechanism are set to an active state and an inactive state, respectively, so that the die is moved in the direction away from the work at high speed.

Nevertheless, the first and second power transmission mechanisms each comprise a number of pulleys and belts, as well as two electromagnetic clutches for switching the power transmission paths. This complicates the mechanisms and increases the parts count. In particular, the second power transmission mechanism has an intermediate shaft arranged between the output shaft of the servo motor and a feed screw of the ball screw mechanism, and transmits rotation via an intermediate pulley on the intermediate shaft. This produces the problem of high inertia with poor response characteristics.

There has recently been proposed a press machine comprising a reciprocating drive mechanism which uses two motors as rotational driving sources. The rotation of a first motor is converted into high-speed low-torque rotation by a reducing device having a lower reduction ratio, and transmitted to a male screw of a male-female screw mechanism. The rotation of a second motor is converted into low-speed high-torque rotation by a reducing device having a higher reduction ratio, and transmitted to a female screw of the male-female screw mechanism (see Publication of Japanese Patent No. 3344721).

According to this reciprocating drive mechanism, the power transmission mechanisms are simplified in configuration, with a reduction in parts count. To prevent the male screw from rotating together with the rotation of the female screw, the male-female screw mechanism requires a braking device, and a control device for controlling the operation of the braking device as well. The reciprocating drive mechanism thus has a large-scale structure as a whole. In addition, since the braking device needs to brake the maximum torque to act on the male screw, the braking device itself becomes greater. This can increase the inertia and make it difficult to achieve favorable response characteristics.

It is an object of this invention to provide a reciprocating drive mechanism which can move a shaping mechanism or the like at low speed to allow a sufficiently high maximum pressing torque during processes under pressure and can also move the shaping mechanism or the like at high speed at approach time and at return time, and a press machine using the mechanism.

Moreover, it is another object of this invention to provide a reciprocating drive mechanism which has simple configuration, a small parts count, small inertia, and favorable response characteristics, and requires no braking device for preventing corotation nor control device thereof to be provided and installed additionally, and a press machine using the mechanism.

DISCLOSURE OF THE INVENTION

A reciprocating drive mechanism according to this invention comprises: a motor as a rotational driving source; first and second power transmission mechanisms for converting rotation of the motor into a high-speed low-torque first rotational output and a low-speed high-torque second rotational output and transmitting the same, respectively; and a conversion mechanism including a nut member and a feed screw, one of which is screw-fed by the other. One and the other of the nut member and the feed screw are coupled with the first power transmission mechanism and the second power transmission mechanism, respectively.

The one coupled with the first power transmission mechanism is provided with a connecting part capable of establishing connection with a drive target in a direction of driving via a gap. The connecting part has a friction surface for undergoing a frictional braking force ascribable to a displacement of the drive target in a direction of eliminating the gap, the friction surface being formed on a side opposed to the drive target across the gap.

In the foregoing configuration of this invention, the motor as the rotational driving source typically uses a servo motor. The first and second power transmission mechanisms each may be composed of, for example, a belt and pulleys, a chain and sprockets, or a combination of a plurality of gears.

The conversion mechanism may be one in which the feed screw is screw-fed or one in which the nut member is screw-fed out of the feed screw and the nut member. In the former case, the feed screw is supported in a screw hole of the nut member so as to be capable of screw-fed rotation. The nut member is rotatably supported by a fixed frame. In the latter case, the nut member is supported on the feed screw so as to be capable of screw-fed rotation. The feed screw is rotatably supported by a fixed frame.

Incidentally, in press brakes of the type where the upper die is moved up and down, for example, the drive target is a ram. In the type where the lower die is moved up and down, the drive target is a bed.

According to a preferred embodiment of this invention, the rotational driving source includes two motors. The rotation of a first motor is converted into the first rotational output by the first power transmission mechanism. The rotation of a second motor is converted into the second rotational output by the second power transmission mechanism. In the configuration of this embodiment, the second motor typically uses one having a maximum torque higher than that of the first motor. This is not restrictive, however, and the two may use motors having the same maximum torque, for example.

The rotational driving source may be composed of a single motor. In this case, the rotation of the motor is converted into the first rotational output by the first power transmission mechanism, and converted into the second rotational output by the second power transmission mechanism. In the configuration of this embodiment, an electromagnetic clutch is arranged at least on the path for transmitting the first rotational output to the conversion mechanism.

A reciprocating drive mechanism according to a preferred embodiment of this invention comprises: two motors as rotational driving sources; a first power transmission mechanism for converting the rotation of a first motor into a high-speed low-torque first rotational output and transmitting the same; a second power transmission mechanism for converting the rotation of a second motor into a low-speed high-torque second rotational output and transmitting the same; and a conversion mechanism including a nut member and a feed screw, one of which is screw-fed by the other. The feed screw and the nut member are coupled with the first power transmission mechanism and the second power transmission mechanism, respectively. The feed screw is supported in a screw hole of the nut member so as to be capable of screw-fed rotation. The nut member is rotatably supported by a fixed frame.

The feed screw is provided with a connecting part capable of establishing connection with a drive target in a direction of driving via a gap. The connecting part has a friction surface for undergoing a frictional braking force ascribable to a displacement of the drive target in a direction of eliminating the gap, the friction surface being formed on a side opposed to the drive target across the gap.

In a preferred embodiment, the first power transmission mechanism includes: a drive pulley for rotating together with a rotating shaft of the first motor; a follower pulley for rotating together with the feed screw; and a belt wound across the two pulleys. In this embodiment, the motor is connected with the feed screw so that it follows the screw-fed operation of the feed screw for reciprocation, or the follower pulley is rendered slidable against the feed screw so that it does not follow the screw-fed operation of the feed screw for reciprocation.

A reciprocating drive mechanism according to another preferred embodiment of this invention comprises: two motors as rotational driving sources; a first power transmission mechanism for converting the rotation of a first motor into a high-speed low-torque first rotational output and transmitting the same; a second power transmission mechanism for converting the rotation of a second motor into a low-speed high-torque second rotational output and transmitting the same; and a conversion mechanism including a nut member and a feed screw, one of which is screw-fed by the other. The nut member and the feed screw are coupled with the first power transmission mechanism and the second power transmission mechanism, respectively. The nut member is supported on the feed screw so as to be capable of screw-fed rotation. The feed screw is rotatably supported by a fixed frame.

The nut member is provided with a connecting part capable of establishing connection with a drive target in a direction of driving via a gap. The connecting part has a friction surface for undergoing a frictional braking force ascribable to a displacement of the drive target in a direction of eliminating the gap, the friction surface being formed on a side opposed to the drive target across the gap.

In a preferred embodiment, the first power transmission mechanism includes: a drive pulley for rotating together with a rotating shaft of the first motor; a follower pulley for rotating together with the nut member; and a belt wound across the two pulleys. The motor is connected with the nut member so that it follows the screw-fed operation of the nut member for reciprocation.

The reciprocating drive mechanism according to this invention is applicable to a press machine such as a press brake and an injection-molding machine. To define this invention in terms of a press machine, the press machine has a shaping mechanism for performing predetermined shaping by pressure, and includes the reciprocating drive mechanism according to any one of the foregoing embodiments as the driving source of the shaping mechanism.

When the press machine according to this invention is applied to a press brake, the shaping mechanism is one in which either one of opposed upper and lower dies is moved up and down so that a plate-like work is pushed into a V groove in the lower die for bending.

Take, for example, a press brake provided with the reciprocating drive mechanism according to this invention, in which the first power transmission mechanism and the second power transmission mechanism are coupled with the feed screw of the conversion mechanism and the nut member of the conversion mechanism, respectively, and the feed screw is supported in the screw hole of the nut member so as to be capable of screw-fed rotation and the nut member is rotatably supported by the fixed frame. Here, at approach time and at return time, the rotation of the motor is converted into the high-speed low-torque first rotational output and transmitted to the feed screw. The feed screw is thus rotated at high speed and screw-fed at high speed, moving the drive target (for example, the ram of the press brake) at high speed.

Then, during a process under pressure, the rotation of the motor is converted into the low-speed high-torque second rotational output and transmitted to the nut member. The nut member is thus rotated at low speed while the feed screw is screw-fed at low speed with no rotation, moving the drive target at low speed. In this case, the reaction force under pressure displaces the drive target in the direction of eliminating the gap. The friction surface of the feed screw thus undergoes the frictional braking force, whereby the feed screw is prevented from rotating together with the rotation of the nut member.

Now, take the case where the first power transmission mechanism and the second power transmission mechanism are coupled with the nut member of the conversion mechanism and the feed screw of the conversion mechanism, respectively, and the nut member is supported on the feed screw so as to be capable of screw-fed rotation and the feed screw is rotatably supported by the fixed frame. At approach time and at return time, the rotation of the motor is converted into the high-speed low-torque first rotational output and transmitted to the nut member. The nut member is thus rotated at high speed and screw-fed at high speed, moving the drive target at high speed.

Then, during a process under pressure, the rotation of the motor is converted into the low-speed high-torque second rotational output and transmitted to the feed screw. The feed screw is thus rotated at low speed while the nut member is screw-fed at low speed with no rotation, moving the drive target at low speed. In this case, the reaction force under pressure displaces the drive target in the direction of eliminating the gap. The friction surface of the nut member thus undergoes the frictional braking force, whereby the nut member is prevented from rotating together with the rotation of the feed screw.

According to the reciprocating drive mechanism of this invention, it is possible during the processing to move the shaping mechanism or the like at low speed to provide a sufficiently-high maximum pressing torque. It is also possible at approach time and at return time to move the shaping mechanism or the like at high speed. In addition, the reciprocating drive mechanism is simple in configuration and small in parts count. Besides, the power transmission mechanisms have small inertia and excellent response characteristics. Then, the small inertia and excellent response characteristics of the power transmission mechanisms can shorten the time necessary for reciprocating drive and reduce the energy consumption.

Moreover, the connecting portion between the conversion mechanism and the drive target has the structure capable of preventing the corotation of the feed screw and the nut member. This eliminates the need for a braking device for preventing corotation or a control device thereof to be provided and installed additionally, thus avoiding the possibility that the reciprocating drive mechanism may grow in scale.

Furthermore, according to the press machine of this invention, the second power transmission mechanism can be set to an active state during a process under pressure so that the shaping mechanism is moved at low speed with a high maximum pressing torque. Moreover, at approach time and at return time, the first power transmission mechanism or the first and second power transmission mechanisms can be set to an active state so that the shaping mechanism is moved at high speed.

BEST MODE FOR CARRYING OUT THE INVENTION

Figure 1:
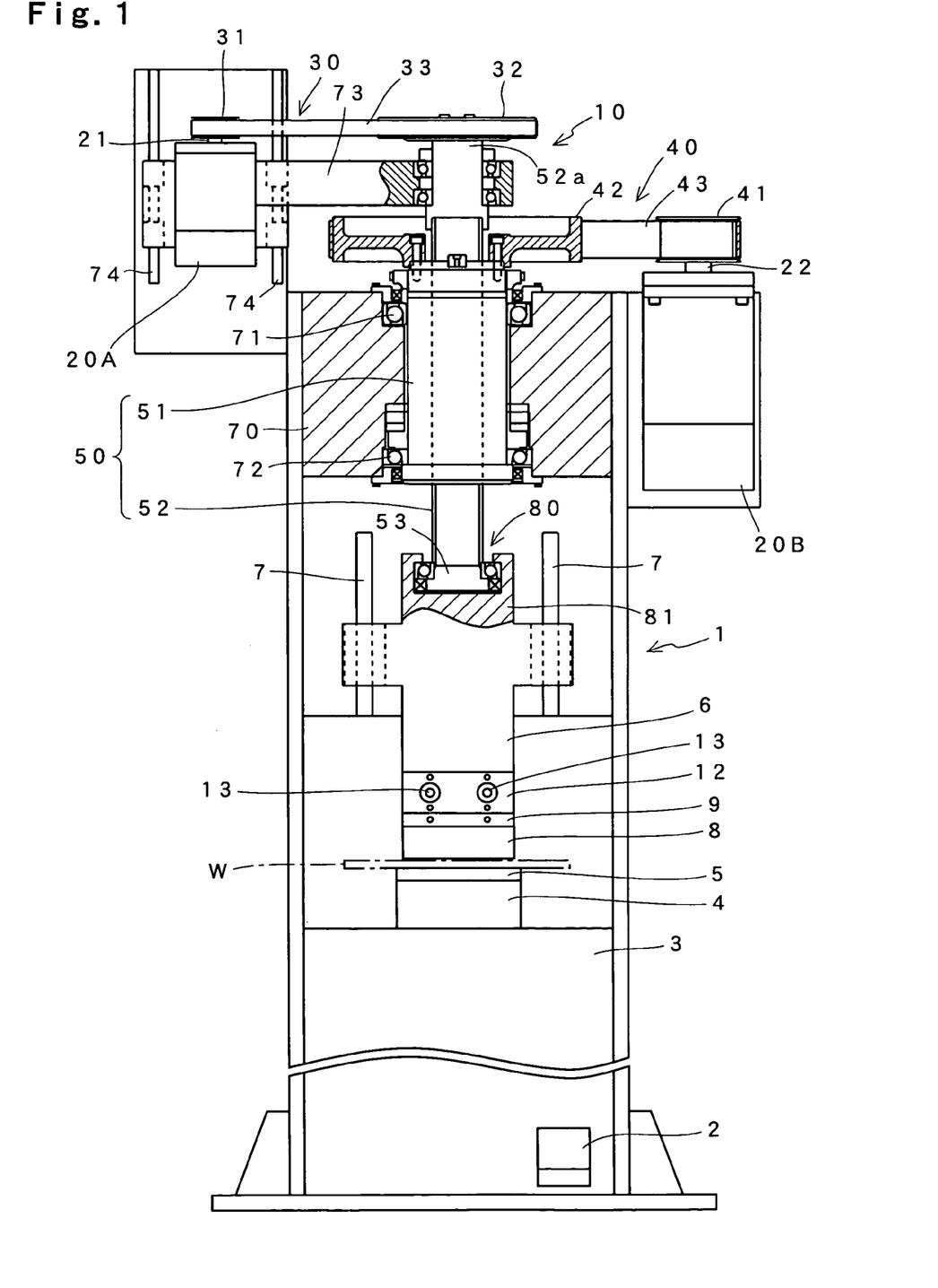
FIG. 1 is a partially-broken front view showing the appearance of a press brake which is an embodiment of this invention.

FIG. 1 shows the configuration of a press brake which is an embodiment of this invention. The press brake of the shown example comprises a machine body 1 which is installed on a floor, and an electric control box (not shown) which is provided with an operation unit for key entry, a display unit for data display, and so on. The machine body 1 is one in which a table 4 for supporting a lower die 5 is attached to the top surface of a bed 3. Above this table 4, a ram 6 is arranged so as to be capable of moving up and down along guides 7 on both sides.

An upper die 8 is attached to the bottom of the ram 6 via an adapter 12 and a holder 9. A plate-like work W supported on the lower die 5 is bent into a predetermined angle under the application of a pressing force from the upper die 8. The adapter 12 is intended to turn right and left eccentric shafts 13 to adjust the tilt of the upper die 8.

A foot switch 2 is arranged in the lower part of the bed 3. When an operator steps on the foot switch 2, a reciprocating drive mechanism 10 is driven to move up and down the ram 6.

The reciprocating drive mechanism 10 includes two alternating-current servo motors 20A and 20B as rotating driving sources, and a ball screw mechanism 50 connected to the individual servo motors 20A and 20B through respective first and second power transmission mechanisms 30 and 40. The ram 6 is hung on the bottom of a feed screw 52 of the ball screw mechanism 50. In this embodiment, the first motor 20A (for example, one having a maximum output of 1.3 kw) is driven at approach time and at return time, and the second motor 20B (for example, one having a maximum output of 4.4 kw) is driven in a bending process. The operations of the individual servo motors 20A and 20B are controlled by a control device 60 (shown in FIG. 5). The control device 60 is built inside the electric control box mentioned above. Incidentally, the second motor 20B is rotated in the direction reverse to that of the first motor 20A, whereas it can be driven not only in a bending process but also at approach time and at return time so that the ram 6 is moved up and down at still higher speed.

The ball screw mechanism 50 converts rotational motions into linear motions to produce a reciprocating drive force for moving up and down the ram 6. The ball screw mechanism 50 includes a nut member 51 which is rotatably supported on a fixed frame 70 with upper and lower bearings 71 and 72, and the feed screw 52 which is supported in a screw hole of this nut member 51 so as to be capable of screw-fed rotation. An unthreaded input shaft 52a is formed integrally on the top end of the feed screw 52. A follower pulley 32 for constituting the first power transmission mechanism 30 is attached and fixed to the top of this input shaft 52a.

The first power transmission mechanism 30 is intended to reduce the speed of the rotation of the first motor 20A at a predetermined reduction ratio (1/A), thereby converting the rotation into a high-speed low-torque rotational output and transmitting the same to the feed screw 52 of the ball screw mechanism 50. The first power transmission mechanism 30 consists of a drive pulley 31 arranged on an output shaft 21 of the first motor 20A, the follower pulley 32 arranged on the input shaft 52a, and a belt 33 wound across the drive pulley 31 and the follower pulley 32.

A follower pulley 42 for constituting the second power transmission mechanism 40 is attached to the top end of the nut member 51.

The second power transmission mechanism 40 is intended to reduce the speed of the rotation of the second motor 20B at a predetermined reduction ratio (1/B) higher than the foregoing reduction ratio (1/A), thereby converting the rotation into a low-speed high-torque rotational output and transmitting the same to the nut member 51 of the ball screw mechanism 50. The second power transmission mechanism 40 consists of a drive pulley 41 arranged on an output shaft 22 of the second motor 20B, the follower pulley 42 arranged on the nut member 51, and a belt 43 wound across the drive pulley 41 and the follower pulley 42.

Here, the first reduction ratio (1/A) is given by $1/A=N_b/N_A$, where $N_A$ is the maximum available number of rotations of the first motor 20A, and Nb is the number of rotations of the feed screw 52 of the ball screw mechanism 50 when moving up and down the ram 6 at a desired maximum speed. The diameters of the respective pulleys 31 and 32 in the first power transmission mechanism 30 are thus set in accordance with the first reduction ratio (1/A).

Meanwhile, a maximum pressing torque Tp may be determined freely by the second reduction ratio (1/B). The diameters of the respective pulleys 41 and 42 in the second power transmission mechanism 40 are thus set as appropriate in accordance with the second reduction ratio (1/B). Here, the maximum pressing torque Tp is given by $Tp=B \cdot T_B$, where $T_B$ is the maximum torque of the second motor 20B.

When the first motor 20A rotates, the feed screw 52 of the ball screw mechanism 50 rotates with the rotation of the first motor 20A and is screw-fed by the nut member 51 which makes no rotation. When the second motor 20B rotates, on the other hand, not the feed screw 52 but the nut member 51 rotates so that the feed screw 52 is screw-fed by the rotating nut member 51. In this case, the feed screw 52 is restrained from rotating together by a corotation prevention mechanism 80.

In order for the first motor 20A to follow the screw-fed operation of the feed screw 52 for reciprocation, the first motor 20A and the input shaft 52a of the feed screw 52 are connected by a connecting frame 73. The first motor 20A is fixed to one end of the connecting frame 73, and the input shaft 52a is rotatably held by the other end of the connecting frame 73. Consequently, when the feed screw 52 moves up and down, the first motor 20A reciprocates together with the connecting frame 73 along right and left guide shafts 74.

Figure 2:
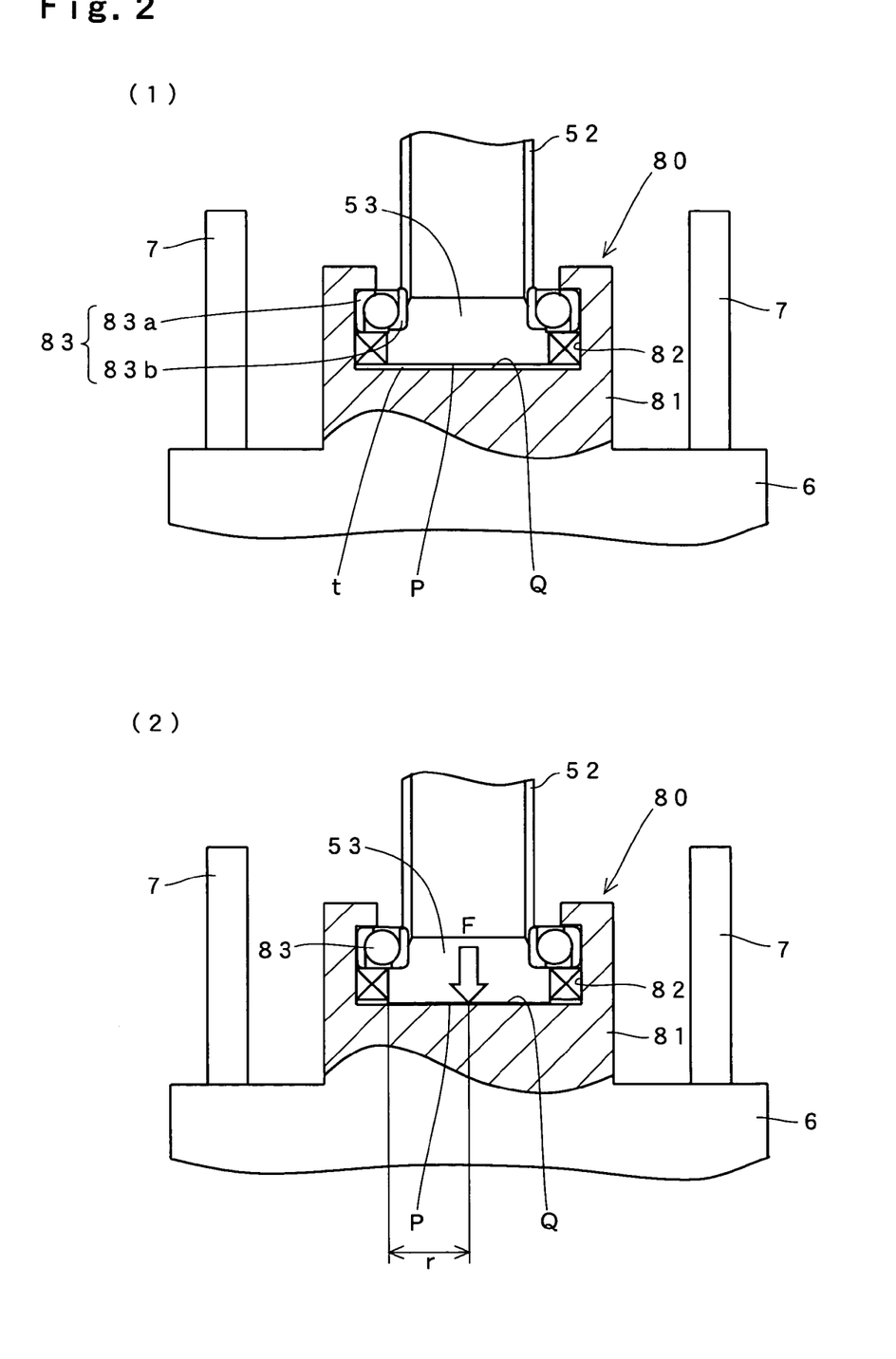
FIG. 2 is a partially-broken, enlarged front view showing the configuration and operation of a corotation prevention mechanism.

The corotation prevention mechanism 80 is one for applying a frictional braking force to a friction surface P, which is formed on the bottom end of the feed screw 52, so that the feed screw 52 does not rotate together with the rotation of the nut member 51. FIG. 2 shows the specific configuration of this corotation prevention mechanism 80 as enlarged. Incidentally, in this embodiment, the torque to be applied to the nut member 51 is higher than the torque to be applied to the feed screw 52. This prevents the possibility that the nut member 51 rotates together with the rotation of the feed screw 52. Thus, the nut member 51 is not provided with any mechanism for preventing corotation.

In FIG. 2, 53 designates a collar-like connecting part formed on the bottom end of the feed screw 52, and 81 designates a cylindrical connecting part formed at the center of the top end of the ram 6. These connecting parts 53 and 81 connect the bottom of the feed screw 52 and the ram 6, whereby the ram 6 is hung on the bottom of the feed screw 52.

The connecting part 81 of the ram 6 has a connecting hole 82 through which the connecting part 53 of the feed screw 52 is inserted. A bearing 83 arranged inside this connecting hole 82 supports the connecting part 53 of the feed screw 52 rotatably. An angular ball bearing is used as the bearing 83. An outer ring part 83a and an inner ring part 83b of the bearing 83 are fixed to the connecting part 81 of the ram 6 and the connecting part 53 of the feed screw 52, respectively.

The bottom end of the feed screw 52 and the bottom of the connecting hole 82 are provided with friction surfaces P and Q for making contact with each other. At approach time and at return time, the connecting part 81 of the ram 6 presses down the outer ring part 83a of the bearing 83 under the load of the ram 6 including the upper die 8, thereby causing a small displacement downward. As a result, a slight gap t occurs between the friction surfaces P and Q (see FIG. 2(1)). Incidentally, at approach time and at return time, the feed screw 52 is rotated and screw-fed downward. The connecting part 53 of the feed screw 52 thus rotates inside the rotating hole 82 of the ram 6.

In a bending process, the ram 6 undergoes a reaction force corresponding to the pressing force on the work W. The connecting part 81 of the ram 6 thus presses up the outer ring 83*a* of the bearing 83 to cause a displacement upward. This eliminates the gap t and brings the friction surfaces P and Q into contact with each other, so that the friction surface P undergoes a frictional braking force to restrain the rotation of the feed screw 52 (see FIG. 2(2)). During the bending process, the nut member 51 is rotated to screw-feed the feed screw 52, while the frictional braking force mentioned above precludes the feed screw 52 from rotating together with the rotation of the nut member 51.

Suppose here that T is the rotational torque of the nut member 51 under pressure, d is the thread pitch of the nut member 51 and the feed screw 51, F is the load acting on the feed screw 52, μ is the coefficient of friction between the friction surfaces P and Q, and r is the radius of the friction surface P. From the relation of F·d=2π·T, the rotational torque T is expressed by the following equation (1). Moreover, the frictional torque Ta on the friction surface P is expressed by the following equation (2).

$$T = \frac{F \cdot d}{2\pi} \quad (1)$$

$$Ta = \frac{2 \cdot \mu \cdot F}{r^2} \int_0^r x^2 dx \quad (2)$$

$$= \frac{2 \cdot \mu \cdot F}{r^2} \left[\frac{x^3}{3}\right]_0^r$$

$$= \frac{2}{3} \cdot \mu \cdot F \cdot r$$

The condition for precluding the corotation of the feed screw 52 is T<Ta. This inequality results in the following expression (3), which is modified into the following expression (4). The thread pitch d, the coefficient of friction μ, and the radius r of the friction surface P are thus determined so as to satisfy this expression (4).

$$\frac{F \cdot d}{2\pi} < \frac{2}{3} \cdot \mu \cdot F \cdot r \quad (3)$$

$$\frac{3d}{4\pi\mu} < r \quad (4)$$

Incidentally, in the foregoing embodiment, the first motor 20A is made to follow the feed screw 52 for reciprocation. Nevertheless, as in an embodiment shown in FIG. 3, the first motor 20A may be configured to be fixed to the fixed flame 70 without any reciprocation.

Figure 3:
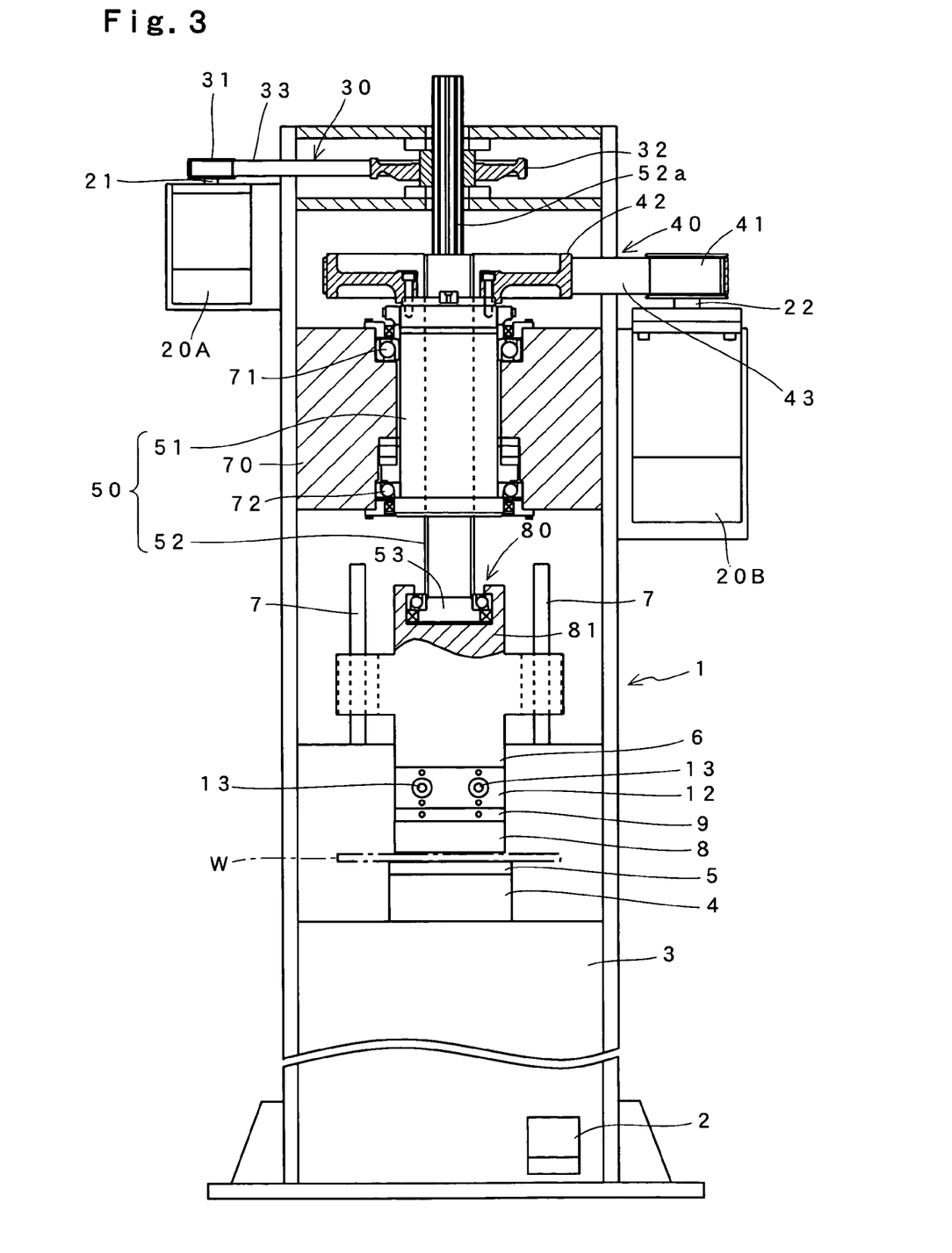
FIG. 3 is a partially-broken front view showing the appearance of another embodiment.

FIG. 3 shows an embodiment in which the follower pulley 32 and the input shaft 52*a* are put into spline connection so that the input shaft 52*a* slides against the follower pulley 32. Since the follower pulley 32 does not follow the screw-fed operation of the feed screw 52 for reciprocation, the first motor 20A can be fixed to the frame 70.

Incidentally, the rest of the configuration of the embodiment in FIG. 3 is the same as that of the embodiment in FIG. 1. Here, corresponding components will be designated by the same numerals, and description thereof will be omitted.

Moreover, in each of the embodiments in FIGS. 1 and 3, the first motor 20A and the second motor 20B are coupled with the feed screw 52 and the nut member 51, respectively. Nevertheless, as in an embodiment shown in FIG. 4, the first motor 20A and the second motor 20B may be coupled with the nut member 51 and the feed screw 52, respectively.

Figure 4:
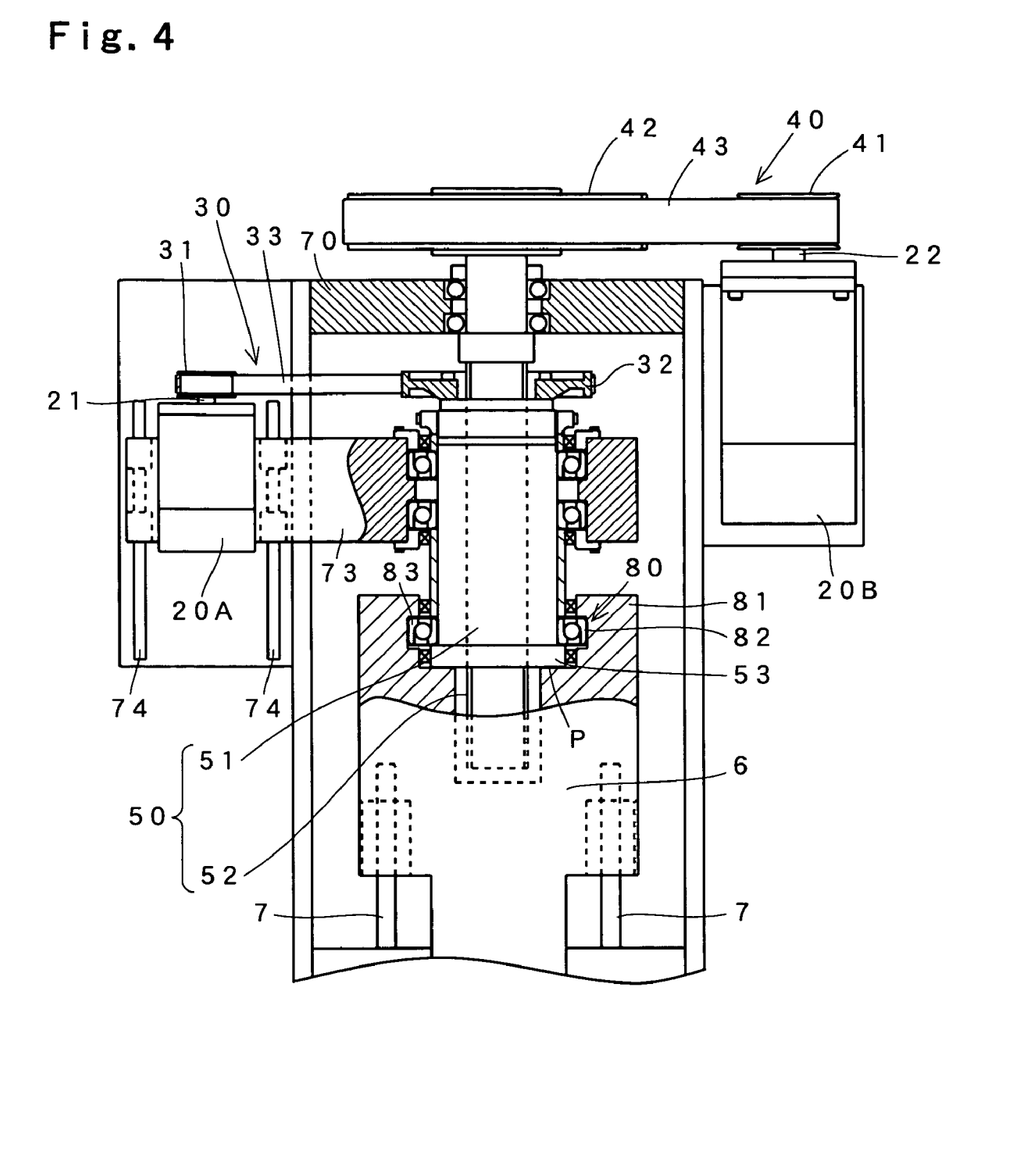
FIG. 4 is a partially-broken front view showing the appearance of another embodiment.

In the embodiment shown in FIG. 4, the feed screw 52 is rotatably supported by the fixed frame 70. The nut member 51 is supported on the feed screw 52 so as to be capable of screw-fed rotation. The first motor 20A and the nut member 51 are connected by the connecting frame 73 so that the first motor 20A follows the screw-fed operation of the nut member 51 for reciprocation. Moreover, the corotation prevention mechanism 80 of this embodiment is one for applying a frictional braking force to a friction surface P which is formed on the bottom end of the nut member 51. This prevents the nut member 51 from rotating together with the feed screw 52.

Incidentally, the rest of the configuration of the embodiment in FIG. 4 is the same as that of the embodiment in FIG. 1. Here, corresponding components will be designated by the same numerals, and description thereof will be omitted.

Figure 5:
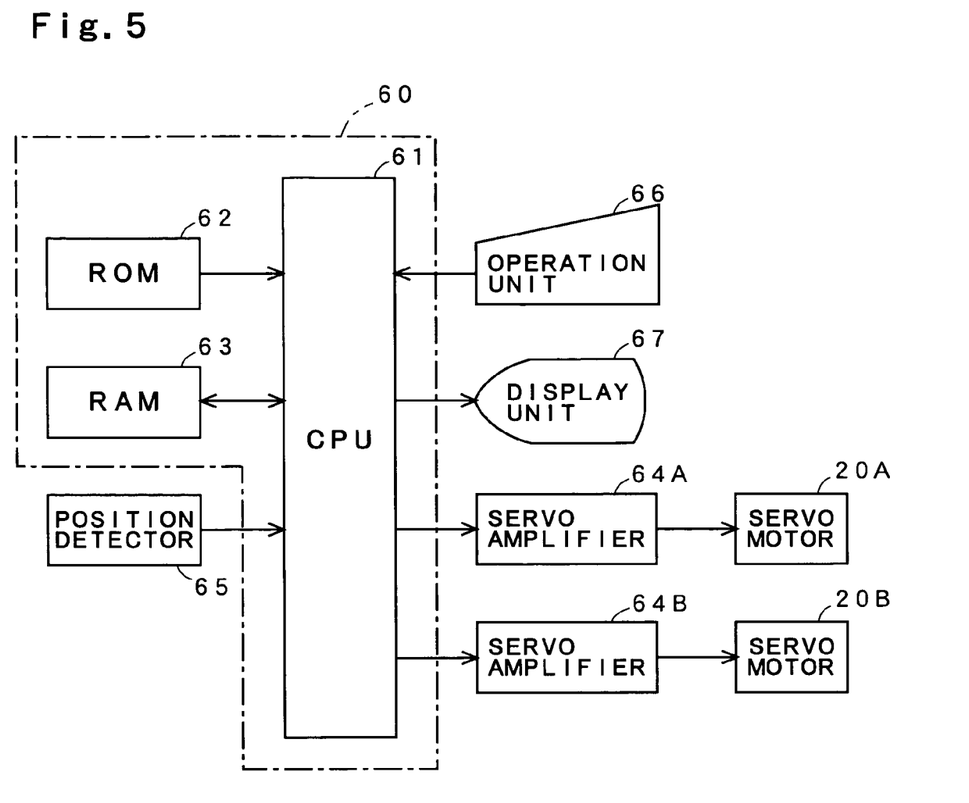
FIG. 5 is a block diagram showing the electric configuration of the press brake.

FIG. 5 shows the electric configuration of the press brake. In the diagram, 60 designates the control device made of a microcomputer, including a CPU 61, a ROM 62, and a RAM 63. The CPU 61 performs various types of operation, and controls the input and output units in series. The ROM 62 contains programs, fixed data, etc. The RAM 63 is used to read and write data such as calculation results.

The CPU 61 outputs electric-current command values to respective first and second servo amplifiers 64A and 64B. The servo amplifiers 64A and 64B amplify output values from the CPU 61 and supply them to the first and second motors 20A and 20B, respectively.

In the diagram, a position detector 65 is a linear sensor, for example. It detects the current position of movement of the ram 6 and outputs the value to the CPU 61. Moreover, an operation unit 66 and a display unit 67 are provided in the electric control box for the sake of data input and data display.

Figure 6:
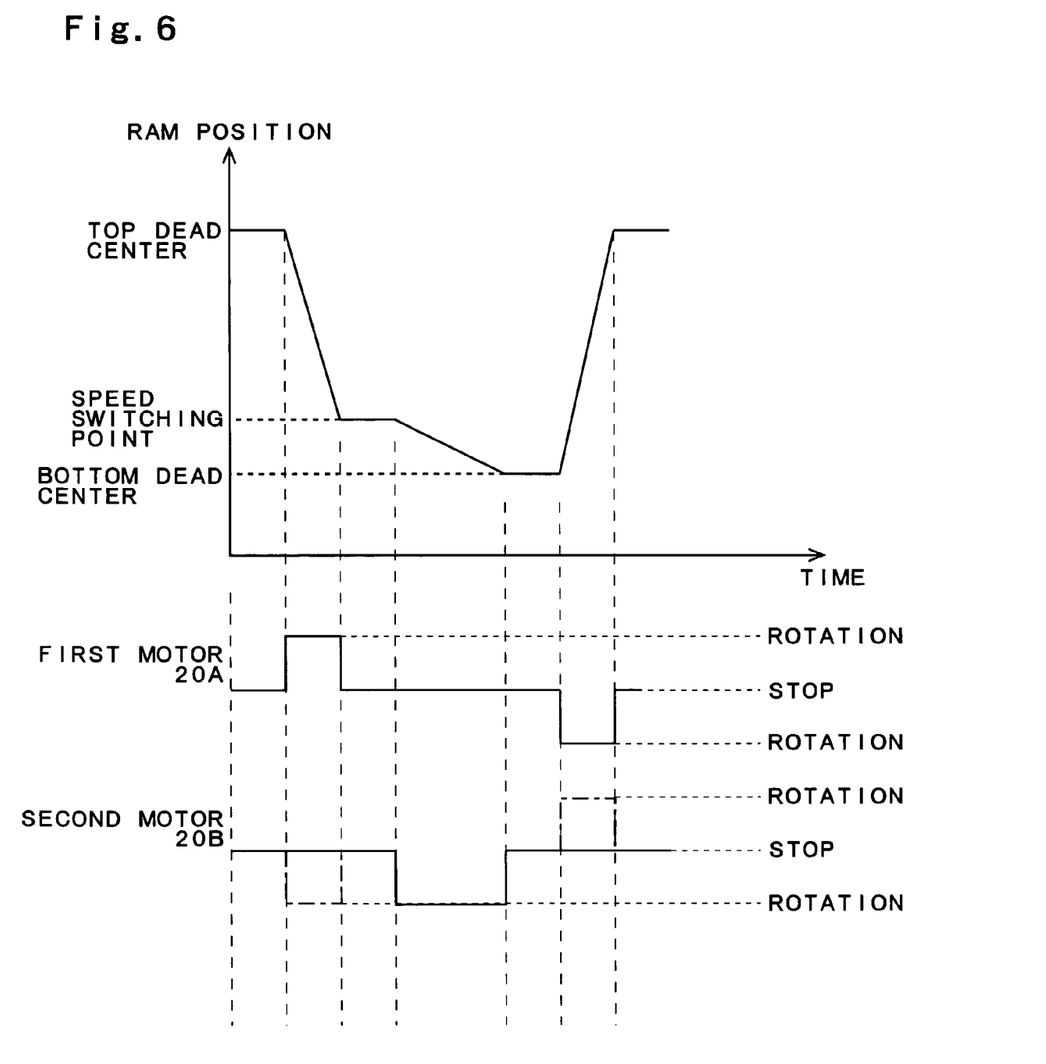
FIG. 6 is an explanatory diagram showing the relationship between the operations of the respective first and second motors and the position of up-and-down movement of the ram (vertical axis)

FIG. 6 shows the relationship between the operations of the respective first and second motors 20A and 20B and the position of up-and-down movement of the ram 6 (vertical axis). Incidentally, description will hereinafter be given of the control on the up-and-down movement of the ram 6 based on this FIG. 6, taking the configuration of FIG. 1 as an example. The same control can also be exercised, however, with the configurations of FIGS. 3 and 4.

Initially, the ram 6 lies in its top dead center, waiting for the operation of the foot switch 2 by an operator. When the foot switch 2 is operated, the CPU 61 starts the rotation of the first motor 20A. At this approach time, the rotation of the first motor 20A is transmitted to the feed screw 52 of the ball screw mechanism 50 through the first power transmission mechanism 30. Consequently, the feed screw 52 is rotated and screw-fed to lower the ram 6 toward the work W at high speed.

The position of up-and-down movement of the ram 6 is monitored by the position detector 65. When the ram 6 reaches a predetermined speed switching point (for example, near the position where the upper die 8 comes into contact with the surface of the work W), the rotation of the first motor 20A is stopped and then the rotation of the second motor 20B is started. In this case, the direction of rotation is opposite to the direction of rotation of the first motor 20A.

The rotation of the second motor 20B is transmitted to the nut member 51 of the ball screw mechanism 50 through the second power transmission mechanism 40. Consequently, the feed screw 52 is screw-fed without rotation. The ram 6 moves down at low speed and bends the work W.

When the ram 6 reaches its bottom dead center, the CPU 61 stops the rotation of the second motor 20B, and then makes the first motor 20A rotate in the direction opposite to at approach time. At return time, the rotation of the first motor 20A is transmitted to the feed screw 52 of the ball screw mechanism 50 through the first power transmission mechanism 30. Consequently, the feed screw 52 is rotated and screw-fed to lift the ram 6 at high speed. When the ram 6 reaches the top dead center, the CPU 61 stops the rotation of the first motor 20A, thereby completing a series of bending operations.

Incidentally, at approach time and at return time, the ram 6 can be moved up and down at still higher speed if the second motor 20B is simultaneously rotated in the direction opposite from that of the first motor 20A (in the diagram, shown by the dashed lines).

The invention claimed is:

1. A reciprocating drive mechanism comprising:
   first and second motors serving as rotational driving sources;
   a first power transmission mechanism for converting a rotation of the first motor into a high-speed low-torque first rotational output and transmitting the first rotational output;
   a second power transmission mechanism for converting a rotation of the second motor into a low-speed high-torque second rotational output and transmitting the second rotational output;
   a conversion mechanism connected to the first and second motors respectively through the first and second power transmission mechanisms, the conversion mechanism converting the first and second rotational outputs into linear motions, the conversion mechanism including a nut member and a feed screw, one of which is screw-fed by the other, the nut member being rotatably supportable by a fixed frame;
   a drive target movable up and down by the linear motions from the conversion mechanism; and
   a co-rotation prevention mechanism having a first connecting part being defined on an end of the feed screw and a second connecting part being defined on the drive target, the first connecting part having a first friction surface, the second connecting part having a second friction surface,
   wherein:
   the feed screw and the nut member are coupled with the first power transmission mechanism and the second power transmission mechanism, respectively;
   the feed screw is supported in a screw hole of the nut member so as to be capable of screw-fed rotation;
   when the reciprocating drive mechanism is placed in an approach mode or in a return mode, a gap is formed between the first and second friction surfaces; and
   when the reciprocating drive mechanism is placed in a bending mode, the second friction surface is moved into contact with the first friction surface to eliminate the gap, so that a frictional braking force formed between the first and second friction surfaces prevents the feed screw from rotating.

2. The reciprocating drive mechanism according to claim 1, wherein:
   the first power transmission mechanism includes a drive pulley for rotating together with a rotating shaft of the first motor, a follower pulley for rotating together with the feed screw, and a belt wound across the two pulleys; and
   the first motor is connected with the feed screw so that it follows the screw-fed operation of the feed screw for reciprocation.

3. The reciprocating drive mechanism according to claim 1, wherein:
   the first power transmission mechanism includes a drive pulley for rotating together with a rotating shaft of the first motor, a follower pulley for rotating together with the feed screw, and a belt wound across the two pulleys; and the follower pulley is rendered slidable against the feed screw so that it does not follow the screw-fed operation of the feed screw for reciprocation.

4. A reciprocating drive mechanism comprising:
   first and second motors serving as rotational driving sources;
   a first power transmission mechanism for converting a rotation of the first motor into a high-speed low-torque first rotational output and transmitting the first rotational output;
   a second power transmission mechanism for converting a rotation of the second motor into a low-speed high-torque second rotational output and transmitting the second rotational output;
   a conversion mechanism connected to the first and second motors respectively through the first and second power transmission mechanisms, the conversion mechanism converting the first and second rotational outputs into linear motions, the conversion mechanism including a nut member and a feed screw, one of which is screw-fed by the other; the feed screw being rotatably supportable by a fixed frame;
   a drive target movable up and down by the linear motions from the conversion mechanism; and
   a co-rotation prevention mechanism having a first connecting part being defined on an end of the nut member and a second connecting part being defined on the drive target, the first connecting part having a first friction surface, the second connecting part having a second friction surface,
   wherein:
   the nut member and the feed screw are coupled with the first power transmission mechanism and the second power transmission mechanism, respectively;
   the nut member is supported on the feed screw so as to be capable of screw-fed rotation;
   when the reciprocating drive mechanism is placed in an approach mode or in a return mode, a gap is formed between the first and second friction surfaces; and
   when the reciprocating drive mechanism is placed in a bending mode, the second friction surface is move into contact with the first friction surface to eliminate the gap, so that a frictional braking force formed between the first and second friction surfaces prevents the nut member from rotating.

5. The reciprocating drive mechanism according to claim 4, wherein:
   the first power transmission mechanism includes a drive pulley for rotating together with a rotating shaft of the first motor, a follower pulley for rotating together with the nut member, and a belt wound across the two pulleys; and the first motor is connected with the nut member so that it follows the screw-fed operation of the nut member for reciprocation.

6. A press machine having a shaping mechanism for performing predetermined shaping by pressure, the machine comprising the reciprocating drive mechanism according to claim 1 as the driving source of the shaping mechanism.

7. A press machine having a shaping mechanism for performing predetermined shaping by pressure, the machine comprising the reciprocating drive mechanism according to claim 2 as the driving source of the shaping mechanism.

8. A press machine having a shaping mechanism for performing predetermined shaping by pressure, the machine comprising the reciprocating drive mechanism according to claim 3 as the driving source of the shaping mechanism.

9. A press machine having a shaping mechanism for performing predetermined shaping by pressure, the machine comprising the reciprocating drive mechanism according to claim 4 as the driving source of the shaping mechanism.

10. A press machine having a shaping mechanism for performing predetermined shaping by pressure, the machine comprising the reciprocating drive mechanism according to claim 5 as the driving source of the shaping mechanism.

11. A press machine having a shaping mechanism in which either one of opposed upper and lower dies is moved up and down so that a plate shaped work is pushed into a V groove in the lower die for bending, the machine comprising the reciprocating drive mechanism according to claim 1 as the driving source of the shaping mechanism.

12. A press machine having a shaping mechanism in which either one of opposed upper and lower dies is moved up and down so that a plate shaped work is pushed into a V groove in the lower die for bending, the machine comprising the reciprocating drive mechanism according to claim 2 as the driving source of the shaping mechanism.

13. A press machine having a shaping mechanism in which either one of opposed upper and lower dies is moved up and down so that a plate shaped work is pushed into a V groove in the lower die for bending, the machine comprising the reciprocating drive mechanism according to claim 3 as the driving source of the shaping mechanism.

14. A press machine having a shaping mechanism in which either one of opposed upper and lower dies is moved up and down so that a plate shaped work is pushed into a V groove in the lower die for bending, the machine comprising the reciprocating drive mechanism according to claim 4 as the driving source of the shaping mechanism.

15. A press machine having a shaping mechanism in which either one of opposed upper and lower dies is moved up and down so that a plate shaped work is pushed into a V groove in the lower die for bending, the machine comprising the reciprocating drive mechanism according to claim 5 as the driving source of the shaping mechanism.

* * * * *